No. 682,842. Patented Sept. 17, 1901.
C. CORRON.
MACHINE FOR TREATING THREAD.
(Application filed Jan. 23, 1901.)
(No Model.)
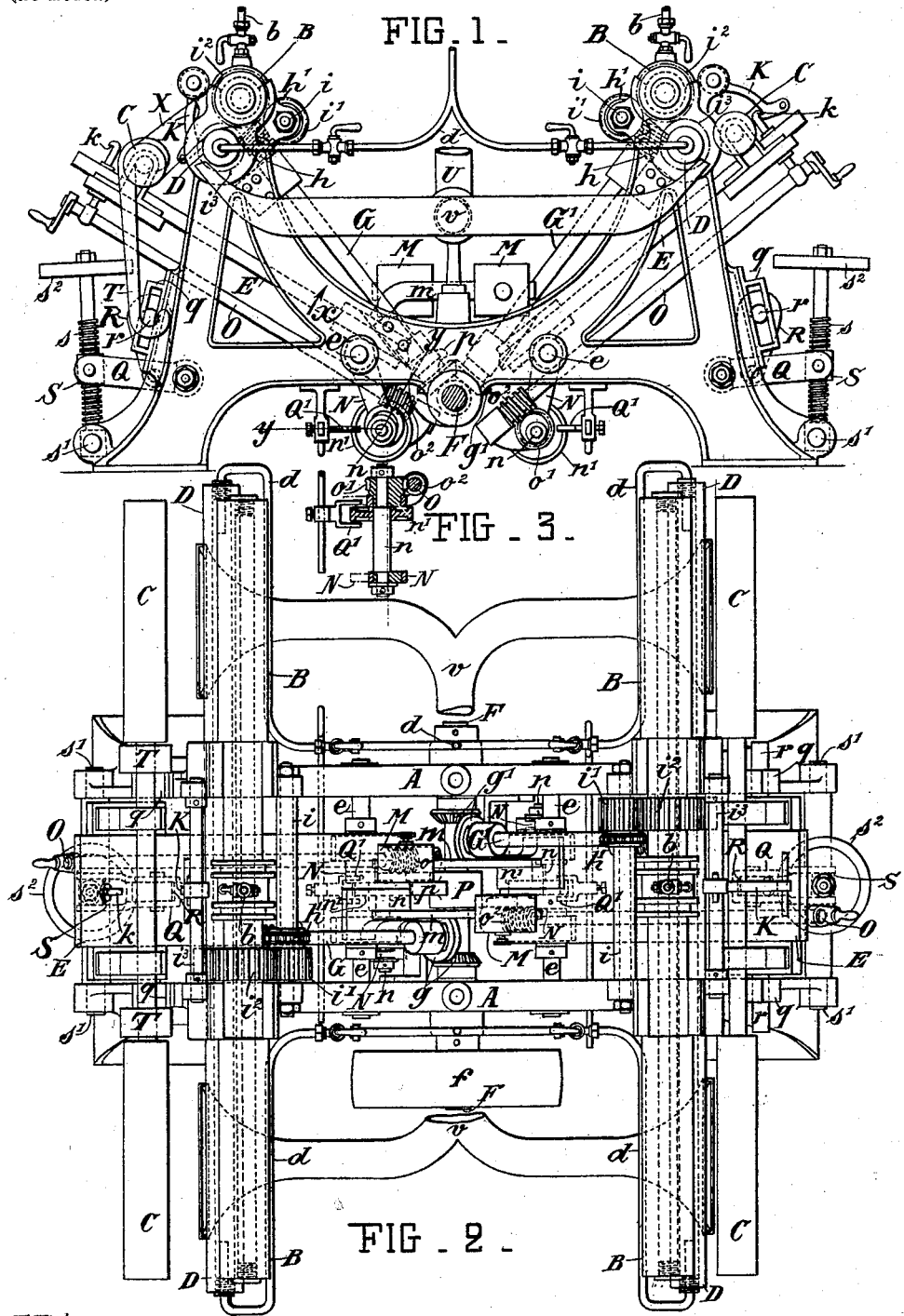
Witnesses:
Inventor

UNITED STATES PATENT OFFICE.

CÉSAR CORRON, OF LYONS, FRANCE.

MACHINE FOR TREATING THREAD.

SPECIFICATION forming part of Letters Patent No. 682,842, dated September 17, 1901.

Application filed January 23, 1901. Serial No. 44,401. (No model.)

*To all whom it may concern:*

Be it known that I, CÉSAR CORRON, a citizen of the Republic of France, residing at Lyons, France, have invented certain new and useful Improvements in Machines for Treating Thread, of which the following is a specification.

This invention relates to the treatment of yarns, thread, and the like in skeins; and the object is to provide a machine for drying, brightening, shaking out, and stretching the material, as will be hereinafter explained.

The machine comprises rotary skein-carriers arranged in pairs and adapted to receive the skeins and supplementary rotative cylinders so placed as to come in contact with the outer surfaces of the skeins, one of the skein-carriers of each pair and the adjacent supplementary cylinder being adapted to be heated with steam for the purpose of drying and brightening the opposite faces of the skeins of filamentous material. Wide-mouthed conduits bring more or less heated air and discharge it upon the skeins to accelerate the drying. The skein-carriers which are not heated are carried in swing-frames hinged to the machine-frame, each swing-frame being provided with an adjustable counterweight and having connected with it a locking device for holding the frame in its elevated position against the action of the weight, which tends to depress it and which may be regulated by the adjustable counterweight. On the other hand, these swing-frames are connected with mechanism which permits of their oscillating when unlocked about their pivotal or hinge axes for the purpose of shaking out the skeins, this shaking mechanism being regulable as to the degree or intensity of the shaking movement imparted. The machine has also a stretching device for each swing-frame, which permits of stretching each of the skeins to the desired extent by forcing the skein-carriers mounted in the swing-frames from those which are heated by steam.

In the accompanying drawings, which serve to illustrate an embodiment of the invention, Figure 1 is an end elevation of the machine, and Fig. 2 is a plan of the same. Fig. 3 is a section in the plan indicated by line $y\ y$ in Fig. 1.

The machine as illustrated has four pairs of skein-carriers, of which the carriers B are rotatively mounted on the frame A of the machine, two alined at each side of the latter and made hollow, so that they may be heated by steam. The steam is supplied by pipes $b$. The unheated skein-carriers C are carried by the swing-frames E, hinged or pivoted at $e$ in the machine-frame. The two carriers C at the right in the drawings are carried by one frame E, and the two at the left by the other frame. Each pair of skein-carriers is combined in operation with a rotative supplementary steam-heated cylinder D, situated parallel with but at a little lower level than the carrier B of the pair in such a position that in the operation of the machine it may come in contact with the outer face of the skein on the corresponding pair of carriers B C. The steam for heating each cylinder D is supplied by a suitable pipe $d$ from any source.

F is the main shaft of the machine, mounted in the lower part of the frame and provided with a belt-pulley $f$ for driving. This shaft drives the inclined shafts G and G' through bevel-gears $g$ and $g'$, and each of said inclined shafts has at its upper end a screw or worm $h$, which gears with and drives a worm-wheel $h'$ on an intermediate shaft $i$. This shaft is geared to the alined and connected skein-carrier B at one side of the machine through toothed wheels $i'$ and $i^2$, the latter being on the shaft or common axis connecting the alined carriers. Each of the wheels $i^2$ gears at its other side with a wheel $i^3$ on the shaft or common axis of the alined cylinders D at that side of the machine. In this manner the carrier B receives a relatively slow rotary motion, and this motion it communicates to the corresponding cylinder D in such a manner that every part of the skein shall be successively dried and brightened, the interior as well as the exterior thereof.

Each of the swing-frames E is provided at its upper end with a hook $k$, adapted to engage a latch K, so as to hold the frame E in its elevated position when not in use. At its lower part each frame E has an arm $m$, carrying above the point $e$ a counterweight M, which is adjustable. This device permits of regulating with precision the effect of the weight which tends to depress the frame and with it the skein-carrier C, which it bears, for stretching the skeins about the pair of carriers B C. On each rock-shaft journaled at $e$ and forming the lower part of a frame E are two arms N, embracing, respectively, two eccentrics, of which one is connected concentrically to a worm-wheel $o'$, gearing with a screw or worm $o^2$ on a shaft O, provided with a hand-crank, the said eccentrics carrying the journal or axis of a roller $n'$, capable of longitudinal displacement. Against the periphery of the roller $n'$ the nose $p$ of a cam P on the main shaft F strikes at each revolution of the latter, thus imparting to the corresponding swing-frame E a certain angular displacement in the direction of the arrow $x$ seen in Fig. 1. As soon as the nose of the cam P passes the roller $n'$ the swing-frame falls back under the influence of gravity with a predetermined weight and force secured through the medium of the counterweight M. These up-and-down vibratory movements of the swing-frame are very rapid and very efficaciously agitate and shake out the skeins on the carriers B C. In operating the shaft O the wheel $o'$ is turned on its axis in such a manner as to increase or diminish the distance of the periphery of the roller $n'$ from the axis of the main shaft F for regulating the intensity or force of the shaking of the skeins in the sense that the latter may be increased or diminished by simply varying the extent of movement of the swing-frame or be maintained constant after stretching the skeins, which necessarily brings about a shortening of the said distance, and consequently an increase of the intensity of the shaking out of the skeins.

At each side of the machine is provided means for stretching the skeins, comprising a lever Q, pivotally fulcrumed on the machine-frame and coupled to a second lever R, with a flattened journal $r$, engaging a fixed keeper-guide $q$. The lever Q carries at its free end a nut S, through which extends an upright screw $s$, having a jointed attachment below at $s'$ to the frame and a hand-wheel $s^2$ at its upper end. The journal $r$ of the lever R may be coupled to the common axis of the two alined skein-carriers C at that side by a coupling-bar T, having a hook at each end, which engage the respective parts, as seen at the left in Fig. 1. The parts may be readily disconnected by the removal of the bar T, as will be the case, for example, while the agitating or shaking out of the skeins is being effected; but when the connection is established by the bar T the operator may, by operating the screw $s$, draw down the skein-carriers C, and thus stretch the skeins on the pairs of carriers B C at that side of the machine. During this stretching operation the roller $n'$ will be shifted so that it will not be acted on by the cam P, and this may be effected either through the operation of the shaft O or by means of a shifting-fork $Q'$, which embraces said roller $n'$ and serves to move it laterally out of the path of the cam. The object of this shifting is of course to avoid any action of the cam P on the swing-frame E during the stretching operation.

In order to accelerate the drying of the skeins or to assist in drying them, means are provided for discharging air more or less heated on the skeins while the latter are on the carriers. U is the main air-supply pipe and from it extends branches $v$, terminating in broad outlets adjacent to the respective pairs of skein-carriers. These branches are clearly shown in the drawings. The steam-heated cylinders will of course be provided with means for drawing off the water of condensation. In Fig. 1, at the left, X designates the skein in position on the carriers B C and shows how the heated cylinder D bears thereon. The device $Q'$ is in substance a belt-shifter.

Having thus described my invention, I claim—

1. In a machine for drying, brightening, shaking and stretching filamentous materials in skeins, the combination with rotary skein-carriers one of which is steam-heated, of a swing-frame carrying the lower of the said skein-carriers and adapted to swing up and down for shaking the skein, whereby its downward motion takes place under the influence of gravity with a predetermined weight, automatic means for causing the vibratory movements of the said swing-frame and a stretching device arranged so as to permit to force down the skein-carrier mounted on the swing-frame through the medium of a coupling to be disconnected therefrom when the swing-frame is to be vibrated up and down for the shaking operation.

2. In a machine for drying, brightening, shaking and stretching filamentous materials in skeins, the combination with rotary skein-carriers one of which is steam-heated, a steam-heated cylinder in position to bear on the outer face of the skein and means for driving the said cylinder and carriers, of a swing-frame carrying the lower of the said skein-carriers and adapted to swing up and down for shaking the skein, whereby its downward motion takes place under the influence of gravity with a predetermined weight, automatic means for causing the vibratory movements of the said swing-frame and a stretching device arranged so as to permit to force down the skein-carrier mounted on the swing-frame through the medium of a coupling to be disconnected therefrom when the swing-frame is to be vibrated up and down for the shaking operation.

3. In a machine for drying, brightening, shaking and stretching filamentous materials in skeins, the combination with rotary skein-carriers one of which is steam-heated, of a swing-frame carrying the lower of the said skein-carriers and adapted to swing up and down for shaking the skein, whereby its downward motion takes place under the influence of gravity with a predetermined weight, automatic means for causing the vibratory movements of the said swing-frame and a stretching device comprising an operating-screw, a sliding piece connected thereto and at least one hooked coupling-bar for the temporary connection of the skein-carrier mounted on the swing-frame with the said sliding piece.

4. In a machine for drying, brightening, shaking and stretching filamentous materials in skeins, the combination with rotary skein-carriers one of which is steam-heated, of a swing-frame carrying the lower of the said skein-carriers and adapted to swing up and down for shaking the skein, whereby its downward motion takes place under the influence of gravity with a predetermined weight, automatic means for causing the vibratory movements of the said swing-frame, a stretching device arranged so as to permit to force down the skein-carrier mounted on the swing-frame through the medium of a coupling to be disconnected therefrom when the swing-frame is to be vibrated up and down for the shaking operation and means for regulating the intensity or force of the shaking of the skein in the sense that the latter may be increased or diminished by varying the stroke of the swing-frame, or be maintained constant, after stretching the skein.

5. In a machine for drying, brightening, shaking and stretching filamentous materials in skeins, the combination with rotary skein-carriers one of which is steam-heated, a steam-heated cylinder in position to bear on the outer face of the skein and means for driving the said cylinder and carriers, of a swing-frame carrying the lower of the said skein-carriers and adapted to swing up and down for shaking the skein, whereby its downward motion takes place under the influence of gravity with a predetermined weight, automatic means for causing the vibratory movements of the said swing-frame, a stretching device arranged so as to permit to force down the skein-carrier mounted on the swing-frame through the medium of a coupling to be disconnected therefrom when the swing-frame is to be vibrated up and down for the shaking operation, and means for regulating the intensity or force of the shaking of the skein in the sense that the latter may be increased or diminished by varying the strokes of the swing-frame, or be maintained constant, after stretching the skein.

6. In a machine for drying, brightening, shaking and stretching filamentous materials in skeins, the combination with rotary skein-carriers, one of which is steam-heated, of a swing-frame carrying the lower of the said skein-carriers and adapted to swing up and down for shaking the skein, whereby its downward motion takes place under the influence of gravity with a predetermined weight, a revolved actuating-cam, a roller coöperating therewith and mounted on the swing-frame through the medium of an adjustable eccentric mechanism and a stretching device arranged so as to permit to force down the skein-carrier mounted on the swing-frame through the medium of a coupling to be disconnected therefrom when the swing-frame is to be vibrated up and down for the shaking operation.

7. In a machine for drying, brightening, shaking and stretching filamentous materials in skeins, the combination with rotary skein-carriers one of which is steam-heated, a steam-heated cylinder in position to bear on the outer face of the skein and means for driving the said cylinder and carriers, of a swing-frame carrying the lower of the said skein-carriers and adapted to swing up and down for shaking the skein, whereby its downward motion takes place under the influence of gravity with a predetermined weight, automatic means for causing the vibratory movements of the said swing-frame, a stretching device arranged so as to permit to force down the skein-carrier mounted on the swing-frame through the medium of a coupling to be disconnected therefrom when the swing-frame is to be vibrated up and down for the shaking operation and means for projecting a blast of hot air against the skein on the carriers, below the said steam-heated cylinder.

In witness whereof I have hereunto signed my name, this 2d day of January, 1901, in the presence of two subscribing witnesses.

CÉSAR CORRON.

Witnesses:
JEAN GERMAIN,
THOS. N. BROWNE.